United States Patent
Finkelshtein et al.

(10) Patent No.: US 12,229,640 B2
(45) Date of Patent: Feb. 18, 2025

(54) MACHINE LEARNING MODEL TRAINED USING FEATURES EXTRACTED FROM N-GRAMS OF MOUSE EVENT DATA

(71) Applicant: International Business Machines Corporation, Armonk, NY (US)

(72) Inventors: Andrey Finkelshtein, Beer Sheva (IL); Anton Puzanov, Mitzpe Ramon (IL); Noga Agmon, Givat Shmuel (IL); Eitan Menahem, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 17/106,858

(22) Filed: Nov. 30, 2020

(65) Prior Publication Data

US 2022/0172102 A1     Jun. 2, 2022

(51) Int. Cl.
*G06N 20/00* (2019.01)
*G06F 3/03* (2006.01)
*G06F 9/54* (2006.01)
*G06N 5/01* (2023.01)

(52) U.S. Cl.
CPC ........... *G06N 20/00* (2019.01); *G06F 3/0312* (2013.01); *G06F 9/542* (2013.01); *G06N 5/01* (2023.01)

(58) Field of Classification Search
CPC ........ G06N 20/00; G06N 5/01; G06F 3/0312; G06F 9/542
See application file for complete search history.

(56) References Cited

U.S. PATENT DOCUMENTS

| | | | |
|---|---|---|---|
| 10,262,324 B2 | 4/2019 | Turgeman et al. | |
| 10,263,996 B1 | 4/2019 | Goodsitt et al. | |
| 10,621,585 B2 | 4/2020 | Turgeman et al. | |
| 2015/0131850 A1* | 5/2015 | Qvarfordt | G06T 7/74 |
| | | | 382/103 |
| 2017/0140384 A1 | 5/2017 | Zoldi et al. | |
| 2017/0285755 A1* | 10/2017 | Churchill | G06N 5/04 |
| 2018/0039620 A1* | 2/2018 | Ciulla | G06F 40/289 |
| 2021/0157716 A1* | 5/2021 | Allen | G06F 11/3688 |
| 2021/0264003 A1* | 8/2021 | Solano | G06N 5/01 |

OTHER PUBLICATIONS

Cai et al., "Mitigating Behavioral Variability for Mouse Dynamics: A Dimensionality-Reduction-Based Approach," IEEE Transactions o Human-Machine Systems, Apr. 2014, pp. 244-255, vol. 44, No. 2.
Hu, et al., "An insider threat detection approach based on mouse dynamics and deep learning," Security and Communication Networks, Feb. 17, 2019, 23 pages.
Stammati et al., "FEBA: An Action-Based Feature Extraction Framework for Behavioural Identification and Authentication," 2016 11th International Conference on Availability, Reliability and Security (ARES), Salzburg, 2016, pp. 715-724, doi: 10.1109/ARES. 2016.31.

* cited by examiner

*Primary Examiner* — Casey R. Garner
(74) *Attorney, Agent, or Firm* — Stosch Sabo (57) ABSTRACT

An example system includes a processor to receive mouse event data of a session. The processor is to split the mouse event data of the session into mouse event n-grams. The processor is to extract features from the mouse event n-grams. The processor is to send the extracted features to a trained machine learning model. The processor is to receive an output decision from the trained machine learning model.

14 Claims, 7 Drawing Sheets

MACHINE LEARNING MODEL TRAINED USING FEATURES EXTRACTED FROM N-GRAMS OF MOUSE EVENT DATA

BACKGROUND

The present techniques relate to machine learning. More specifically, the techniques relate to training a machine learning model using mouse event data. For example, mouse event data includes mouse clicks, mouse movements, scrolling, etc.

One of the most common forms of malicious online activity is the account takeover (ATO), where a user gains unauthorized access to takeover an online account. Such user may then be able to change account details, make purchases, withdraw funds, and gain sensitive and confidential data. Identifying and stopping ongoing ATO problems, before they succeed and damage is done, is among the highest priorities for such organizations. To facilitate prevention of ATO issues, various organizations apply different detection technologies, some of which collect various data types such as mouse-movement, device usage, location, and others.

Existing malicious activity detection technologies utilize mouse data of users in order to detect malicious sessions and for user authentication and authorization. However, most of these technologies focus on the movement patterns and may ignore other types of events. Other detection techniques utilize keystrokes data and extracting attributes known as n-grams. These n-gram attributes are based on the characters the user typed during the session and focus mainly on the time between the keystrokes. However, these detection techniques may not involve the use of mouse data.

SUMMARY

According to an embodiment described herein, a system can include processor to receive mouse event data of a session. The processor can also further split the mouse event data of the session into mouse event n-grams. The processor can also extract features from the mouse event n-grams. The processor can also further send the extracted features to a trained machine learning model. The processor can receive an output decision from the trained machine learning model. The system may thus enable improved detection via a machine learning model trained using mouse event data.

According to another embodiment described herein, a method can include receiving, via the processor, mouse event data of a plurality of online sessions. The method can further include splitting, via the processor, the mouse event data for each of the plurality of online sessions into mouse event n-grams. The method can also further include calculating, via the processor, features based on the mouse event n-grams for each session. The method can also include training, via the processor, a machine learning model based on the calculated features. The method may thus enable improved detection by training a machine learning model using features extracted from mouse event data. Optionally, the method may also include selecting a subset of n-grams of the mouse event n-grams based on a heuristic, wherein the features are calculated based on the selected subset of n-grams. In this embodiment, the method may further provide for improved efficiency of training by using only a subset of n-grams that are chosen based on a heuristic for training.

According to another embodiment described herein, a computer program product for training machine learning models can include computer-readable storage medium having program code embodied therewith. The computer readable storage medium is not a transitory signal per se. The program code executable by a processor to cause the processor to receive mouse event data of a plurality of online sessions. The program code can also cause the processor to split the mouse event data for each of the plurality of online sessions into mouse event n-grams. The program code can also cause the processor to calculate features based on the mouse event n-grams for each session. The program code can also cause the processor to train a machine learning model based on the calculated features. The computer program product may thus enable improved detection by training a machine learning model using features extracted from mouse event data. Optionally, the method may also include selecting a subset of n-grams of the mouse event n-grams based on a heuristic, wherein the features are calculated based on the selected subset of n-grams. In this embodiment, the computer program product may further provide for improved efficiency of training by using only a subset of n-grams that are chosen based on a heuristic for training.

DETAILED DESCRIPTION

According to embodiments of the present disclosure, a computer-implemented method includes receiving, via the processor, mouse event data of a number of online sessions. As used herein, an online session refers to an instance of usage on an endpoint electronic device in which the data of the usage is sent via network to a remote location where the data is processed. For example, the remote location may be a cloud server. The method includes splitting, via the processor, the mouse event data for each of the number of online sessions into mouse event n-grams. The method further includes calculating, via the processor, features based on the mouse event n-grams for each session. The method also further includes training, via the processor, a machine learning model based on the calculated features. The method can also include receiving, via the processor, input mouse event data for a session to be analyzed. The method further includes splitting, via the processor, the mouse event data of the session to be analyzed into mouse event n-grams. The method also further includes calculating, via the processor, features based on the mouse event n-grams for each session. The method includes inputting, via the processor, the calculated features into the trained machine learning model. The method includes receiving, via the processor, an output decision from the trained machine learning model. Thus, embodiments of the present disclosure enable improved detection of malicious behaviors, both online and offline. The present techniques thus focus on mouse event data that is collected during the session of a user in the web application. This mouse event data includes the type of each event, such as a movement event, scrolling event, etc., as well as an accurate time and the position of the mouse on the screen. The present techniques extract patterns of the user during the online session from the mouse event data that are used to both train a machine learning model and analyze malicious activity. More specifically, the present techniques break sessions into n-grams of mouse events and calculate attributes that are input into a machine learning model in order to provide a decision for a malicious session.

Figure 1:
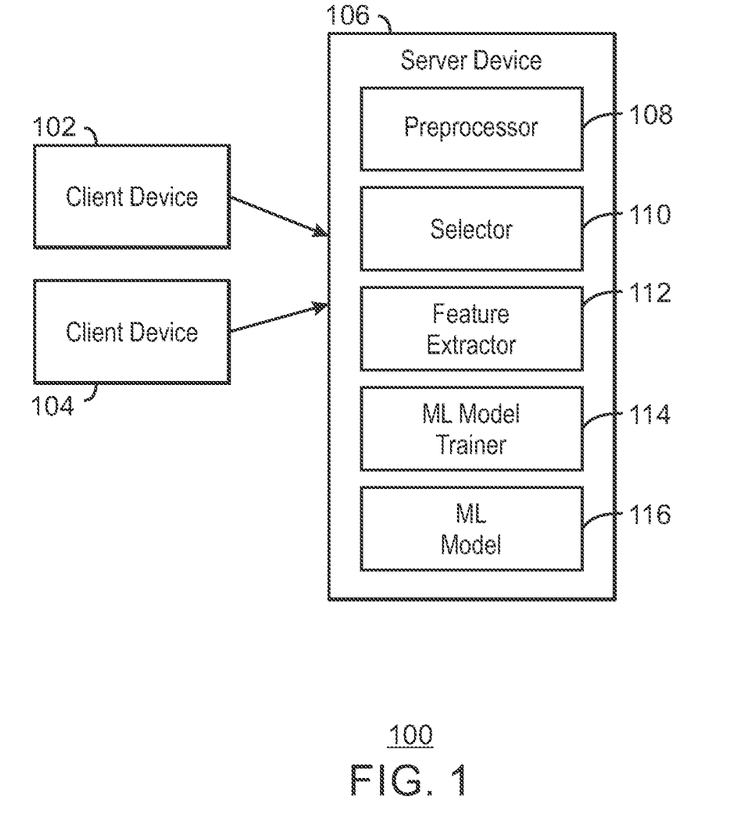
FIG. 1 is a block diagram of an example system for training a machine learning model to detect malicious activity using features extracted from n-grams of mouse event data.

With reference now to FIG. 1, a block diagram shows an example system for training a machine learning model to detect malicious activity using features extracted from n-grams of mouse event data. The example system is generally referred to by the reference number 100.

In the example of FIG. 1, the system 100 includes a client device 102 and a client device 104 communicatively coupled to a server device 106. The server device 106 includes a preprocessor 108, a selector 110, a feature extractor 112, a machine learning (ML) trainer 114, and a machine learning (ML) model 116.

In various examples, the server device 106 may execute a technique to detect malicious sessions. For example, a session may be an online session of a user using a web-based service. In some examples, the server device 106 may utilize users' mouse event data by breaking the mouse event data into n-grams and calculating numeric attributes, referred to herein as features, for the session based on these n-grams. In various examples, the extracted features are used to train a supervised machine learning (ML) model for detecting malicious activity or unsupervised ML model to determine if a session should be considered as an outlier.

Still referring to FIG. 1, the techniques herein may be performed in two stages, including a machine learning training stage and an operational stage. In various examples, the machine learning training stage may be used to train a machine learning model 116 and the operational stage uses the trained machine learning model 116 to generate a decision based on received mouse event data for a session to be analyzed.

In various examples, the machine learning training stage may be supervised or unsupervised. For example, supervised machine learning may include any technique that infers a function from labeled training data in a set of training examples. Unsupervised machine learning may include any machine learning technique that looks for previously undetected patterns in a data set with no pre-existing labels and with a minimum of human supervision. In some examples, the input of the training stage may be unlabeled or labeled mouse event data of sessions. For example, the sessions may be online sessions of users interacting with a website using a mouse. In various examples, the mouse event data may be labeled as positive or negative for malicious activity.

In various examples, the training stage may include pre-processing. The preprocessor 108 may perform a pre-processing individually for each session. In the preprocessing, the preprocessor 108 receives mouse event data and extracts n-grams of mouse events. For example, the preprocessor 108 can break each session into mouse event n-grams. As used herein, an n-gram is defined as a group of adjacent mouse events of size N that occurred on the same page of the application. In various examples, the size N may be configurable or set in advance. In some examples, multiple sizes of n-grams may be extracted. In addition, for every n-gram of the session, the preprocessor 108 can also extract the duration of the events in that n-gram, the screen coordinates of the events, and the types of the events. The preprocessor 108 can thus create n-grams and aggregate them by their event types. For example, preprocessor 108 can group together all the n-grams with the same events in the same order. In some examples, the preprocessor 108 may represent each n-gram by the structure of: [(t1, ..., tN), [(x1, y1), ..., (xN, yN)]], where "t" is the time of the event and "x" and "y" are the screen coordinates of the mouse on a screen when the event occurred or the coordinates within a web page or window in which the event occurred. The preprocessor 108 may thus generate pre-processed data aggregates appearances of n-grams and holds information for each appearance.

In some examples, the training stage may also optionally include an n-grams selector 110. For example, the selector 110 can select a set of n-grams for which attributes will be calculated and on which the ML model 116 will be based on. In some examples, the selector 110 can select the set of n-grams based on a heuristic. Since the number of features for the model depends on the number of n-grams, selecting only a subgroup of n-grams for the ML model 116 may reduce the dimensionality of the resulting ML model 116. Therefore, the selector 110 may be particularly included for configurations in which N is large and the N-grams space is large. In particular, the selector 110 may select only n-grams that are important for the model and ignore n-grams that do not help in detecting malicious sessions. The selection of those N-grams may thus be based on one or more heuristics that determine if each n-gram can help in the task of detection. In various examples, such heuristics may include dropping non-informative or rare n-grams, or both non-informative and rare n-grams. In some examples, the number of all possible n-grams might be large, but some of the N-grams are very rare. The selector 110 may thus select only n-grams that appear in at least X % of the data, where X is an adjustable parameter. If the data is labeled, the selector 110 can determine an adjustable parameter for each class. For example, 2% of the legitimate sessions and 1% percent of the malicious sessions may be set as parameters. In various examples, the heuristics may include a supervised n-grams selection. In this example, for labeled data, the selector 110 can use the labels to select n-grams. In some examples, the supervised n-grams selection may be based on the idea of "term frequency-inverse document frequency" (TF-IDF) method from the information retrieval domain. In normal usage, TF-IDF produces a score of the importance of the word (w) to a document (d) in a collection of documents (D). However, in this heuristic, the N-grams are treated as words and the classes are treated as documents (d∈D={classes of the label}). The term-frequency (TF) value is defined as the number of sessions in which the n-gram appears at-least K times divided by the number of sessions from that class. For example, term-frequency (TF) may be calculated using the equation:

$$TF(w, d, D) = \frac{|\{s \mid \text{count }(w, s) \geq k \text{ and } s \in d\}|}{|\{s \mid s \in d\}|} \quad \text{Eq. 1}$$

where w is an n-gram type, s is the number of sessions in which the n-gram w appears, and k is a configurable parameter. For example, if the 4-gram ("M-S-S-M") appears at least k=2 times in 100 out of 1000 legitimate sessions, then the TF value for the word "M-S-S-M" in the document "legitimate" will be 100/1000=0.1. The inverse document frequency (IDF) for this use case is defined as the summation of the TF value for the current class (document) and a compliment to TF value (1-TF) for that word in other classes divided by the number of classes. For example, the inverse document frequency (IDF) may be calculated using the equation:

$$IDF(w, d, D) = \frac{TF(w, d, D) + \sum_{e \in D \neq d} 1 - TF(w, e, D)}{|D|} \quad \text{Eq. 2}$$

In various examples, the heuristic can select M (parameter) N-Grams from each class or take M (parameter) n-grams with a maximal TF-IDF value in general.

In various examples, the training stage also includes a feature extraction. The feature extractor 112 may extract features in order to create a dataset that is suitable for machine learning training. For example, the feature extractor 112 may calculate features based on the n-grams for each session. In some examples, the feature extractor 112 calculates the features based on a set of selected n-grams. For example, the feature extractor 112 can calculate features for each of the n-grams or for the n-grams that were selected in the previous step if it was applied. In various examples, the calculation is performed separately for each of the n-grams. In some examples, the features that are calculated for the n-grams include information about how common the n-gram in the session, statistical values on the duration of n-grams and the movement of the mouse within the events of the n-gram. Examples for features that can be extracted for each n-gram include a number of occurrences feature. The number of occurrences feature may indicate how many times the n-gram occurred during the session. Another example of a feature is a ratio from total feature. The ratio from total feature may be calculated as the number of occurrences of a particular type of n-gram divided by the total number of n-grams in the session. Additional example features that may be generated by the feature extractor 112 are a minimal, maximal, mean, median, or standard deviation duration of the n-gram. In various examples, the duration of each n-gram may be defined as the event time of the last event minus event time of the first event of the n-gram. Another feature that may be generated is distance on axis x or axis y. The distance on axis x or axis y feature may indicate the total pixels the mouse moved on axis x or axis y. For example, the distance on axis x or axis y feature may be calculated by subtracting the x/y coordinate of first event from the x/y coordinate of last event. In some examples, the feature extractor 112 may extract an absolute distance on axis feature. For example, the absolute distance on axis feature may be calculated as summation of the absolute values the mouse moved between events on axis x/y. In various examples, the feature extractor 112 may further extract a Euclidian distance feature or absolute Euclidian distance features. The Euclidian distance feature or absolute Euclidian distance features may be similar to the distance on axis and absolute distance on axis features described above, but using both x and y coordinates and calculating Euclidian distance between the events. In some examples, the feature extractor 112 may extract a curvature metric feature. For example, the curvature metric feature may measure the circular or straight movement pattern. Such a feature may be applicable for events with mouse movement. For every n samples $[(x_1, y_1) \ldots (x_i, y_i)]$, the feature extractor 112 may perform a polynomial interpolation to the order of m, and generate a curvature score by taking the absolute values of the m coefficients as features or by the ratio $$\frac{\text{Length of interpolated line}}{\text{Distance on axis } (x/y)}.$$

In various examples, the feature extractor 112 may also extract a historic comparison feature. For example, the historic comparison feature may indicate the deviation of a feature from previous user's sessions. For example, the historic comparison of a feature may be calculated for every feature f using the equation:

$$H_{Comparison}(f_i) = \frac{f_i - \mu_{f_i}}{\sigma_{f_i}} \quad \text{Eq. 3}$$

where $\mu_{f_i}$ is the average of feature $f_i$ and $\sigma_{f_i}$ is the standard deviation of feature $f_i$.

The ML model trainer 114 may then train a machine learning model. In various examples, the ML model trainer 114 may train the machine learning model using supervised or unsupervised training techniques. In some examples, the output of the ML model trainer 114 may be a supervised or an unsupervised machine learning model 116. For example, the ML model trainer 114 can construct a training dataset with N rows (sessions) and M columns (features) for each session that are computed in the previous steps. In various examples, if some n-gram did not occur during a session, then the values of the features that are calculated for that n-gram are set as missing values. In some examples, if the dataset is labeled, then the ML model trainer 114 can train a machine learning classifier to perform the task of classifying sessions according to the given labels. For example, the given labels may be "Legitimate" or "Malicious". In various examples, a machine learning classifier can be a naive Bayes, Random Forest, Gradient Boosting Trees, Neural Network, or any other suitable machine learning classifier. In some examples, if the data is unlabeled, then the ML model trainer 114 can train a machine learning outlier detection model to detect outliers. For example, the machine learning outlier detection model may be an isolation forest, one class state vector machine (SVM), etc.

In the operational stage, the server device 106 may then use the trained machine learning model 116 in order to generate a classification or an outlier score. In this operational stage, the server 106 receives mouse event data of a malicious session in question and provides a decision for that session. For example, the mouse event data may be received from the client device 102 or the client device 104. The decision can be a classification of the session. For example, the decision may output the label "Legitimate" or "Malicious". In some examples, the decision may output whether the session should be considered as an outlier. In both cases the decision can be supported with a score that indicates the confidence of the model for the decision.

In various examples, the operational stage may include the following actions. First, a preprocessing similar to the pre-processing as described above in the training stage may be performed by the preprocessor 108. For example, the preprocessor 108 can break each session into mouse event n-grams as in the training stage. If n-grams were selected in the training stage, then in the operational stage, the preprocessor 108 will ignore n-grams that were not selected in the training stage. A feature extraction may also be performed by the feature extractor 112 to extract features in the same manner as described in the feature extraction step in the training stage. For example, during the operational stage, the feature extractor 112 can calculate features based on the n-grams for the session. A model decision may then be executed using the ML model 116. After calculating the M n-gram features, the ML model trainer 114 organizes them in the same order as during the training stage and inputs these features to the ML model 116. The ML model 116 may then provide a decision and a confidence score that will be passed as output. For example, the server device 106 may then apply the trained ML model 116 to provide a decision for the session. For example, the ML model 116 may be a neural network that receives the extracted features from the feature extractor 112 and outputs a decision, such as a classification with or without a confidence score. In various examples, the confidence score may be an indicator of the reliability of the label <outlier score>. In some examples, an outlier score may indicate how much the online session deviates from the norm, which was learned during the training phase. For example, the outlier score may range from 0 to 1, where 0 may indicate a perfect normal online session and 1 may indicate an anomalous session with respect to the trained model. In various examples, if the outlier score passes a pre-defined threshold, then the session may be marked as an outlier and the outlier score may be output as an indicator of confidence. For example, the ML model 116 may output a positive or negative label as in the example below.

TABLE 1

Mouse event data for a "Session 1"

| Page | Time (relative) | Event type | Screen X | Screen Y |
|---|---|---|---|---|
| Login | 0 | M (move) | 15 | 25 |
| Login | 25 | M | 20 | 32 |
| Login | 35 | M | 41 | 35 |
| Login | 42 | S (scroll) | 41 | 35 |
| Login | 48 | S | 41 | 35 |
| Login | 58 | DL (Left click down) | 41 | 35 |
| Login | 59 | UL (left click up) | 41 | 35 |
| Home | 85 | M | 38 | 32 |
| Home | 85 | M | 53 | 42 |

In the above example "session 1", M refers to a move event type, S refers to a scroll event type, DL refers to a left click down even type, and UL refers to a left click up event type. In the above example, a set of bigrams may be selected to be extracted and aggregated. For example, an aggregated set of three move-move (M-M) bigrams may include [(0, 25), [(15, 25), (20, 32)]]; [(25, 35), [(20, 32), (41, 35)]]; [(85, 85), [(20, 32), (41, 35)]. A move-scroll (M-S) bigram set may include the bigram: [(35, 42), [(41, 35), (41, 35)]]. A scroll-scroll (S-S) bigram set may include the bigram: [(42, 48), [(41, 35), (41, 35)]]. A scroll-left click down (S-DL) bigram set may include the bigram: [(58, 58), [(41, 35), (41, 35)]]. A left click down-left (DL-UL) bigram set may include the bigram: [(58, 59), [(41, 35), (41, 35)]]. In this example, a set of features may then be extracted for each of these bigrams in "session 1", as shown in the table below.

TABLE 2

Extracted Features and Labels for Example Sessions 1 and 2

| Session ID | M-M ratio | M-M mean time | M-M median distance | ... | M-S mean X-axis time | Label |
|---|---|---|---|---|---|---|
| Session_1 | 0.42 | 11.66 | 57 | ... | 7 | Positive |
| Session_2 | 0.76 | 15.43 | 42 | ... | 9.2 | Negative |

Table 2 includes extracted features for two sessions, including session 1 discussed above. For example, the features may include an M-M ratio feature that indicates a ratio of a particular bigram to the total number of bigrams detected. In the example of session 1 shown above, there are three total M-M bigrams, with a total of 7 bigrams. Thus, the M-M ratio is calculated as 3/7=0.42. The features also include an M-M mean time feature that indicates a mean time of the aggregated M-M bigrams. For example, in session 1 shown above, the M-M mean time feature is calculated as an average of the difference between the relative times [(25-0)+(35-25)+(85-85)]/3=11.66. Similarly, the features shown in Table 2 also include an M-M median distance that measures the median distance of the aggregated M-M bigrams. For example, the M-M median distance for Session 1 is calculated using an average of the Euclidean distance between the points of mouse events. The Euclidean distance may be calculated using the square root of the sum of the squared differences of the coordinates of the two points for each M-M bigram. The M-S mean X-axis feature may be calculated as the average distance in pixels that the mouse moved on the horizontal axis (X) during M-S occurrences.

The example of Table 2 also includes a label for each of sessions 1 and 2. In the example, session 1 is labeled as positive and session 2 is labeled negative. For example, positive may indicate a malicious session and negative may indicate a normal session. In various examples, any labels may be used. In this example, the ground truth labels are included for training purposes, where the multiple sessions are input into a machine learning algorithm along with the corresponding ground truth labels to train and output a particular trained machine learning model. By contrast, after training, the features would be extracted from a session to be analyzed and input into a machine learning network using the trained machine learning model. The machine learning network may then output a label for the session based on the input features.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional servers, etc.). For example, the system 100 may not include the selector 110.

Figure 2:
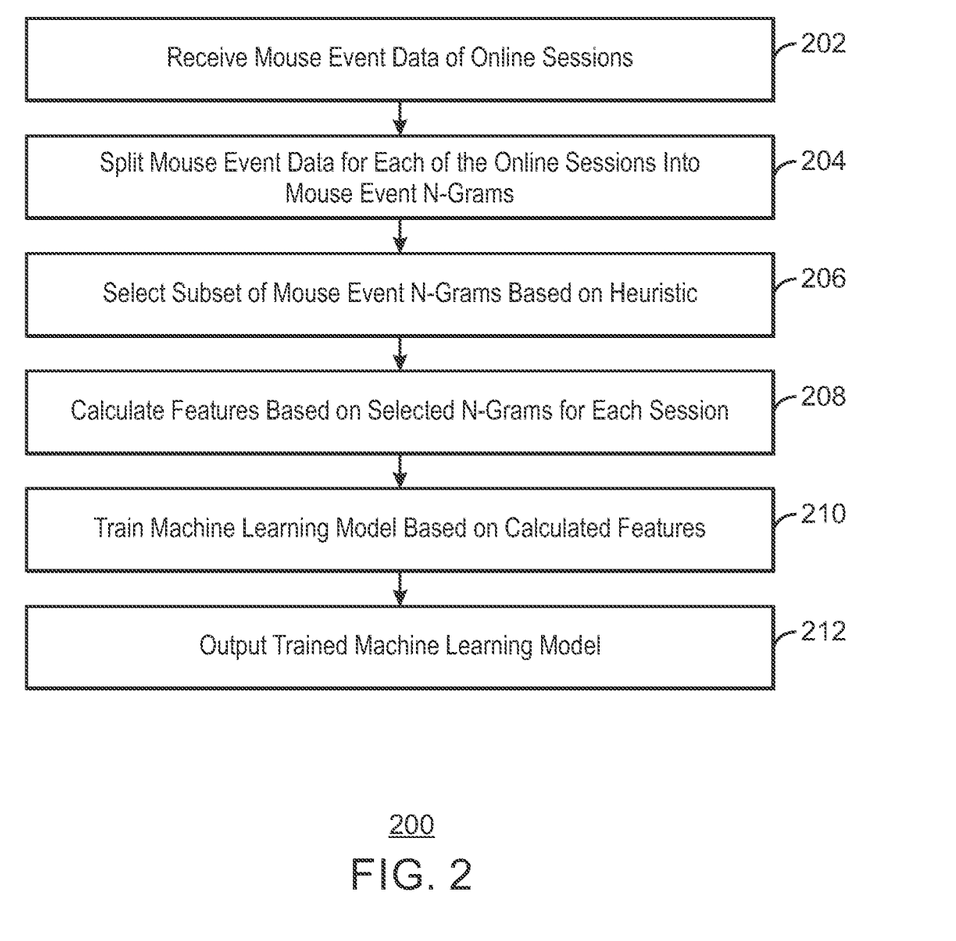
FIG. 2 is a block diagram of an example method that can train a machine learning model using extracted features from n-grams of mouse event data.

FIG. 2 is a process flow diagram of an example method that can train a machine learning model using extracted features from n-grams of mouse event data. The method 200 can be implemented with any suitable computing device, such as the computing device 400 of FIG. 4 and is described with reference to the system 100 of FIG. 1. For example, the methods described below can be implemented by the processor 402 of FIG. 4.

At block 202, a processor receives mouse event data of online sessions. For example, the mouse event data may include mouse clicks, mouse movements, and scrolling events, and associated relative times, pages, and screen positions.

At block 204, the processor splits the mouse event data of each of the online sessions into mouse event n-grams. The mouse event n-grams may be consecutive mouse events of number n. For example, the mouse event n-grams maybe bigrams, trigrams, 4-grams, etc. In some examples, any number of mouse event n-grams may be generated. For example, a combination bigrams and trigrams may be generated.

At block 206, the processor selects a subset of the mouse event n-grams based on a heuristic. In some examples, the heuristic may be a term-frequency-inverse document frequency (TF-IDF) heuristic that uses n-grams as terms and the sessions as a document.

At block 208, the processor calculates features based on the mouse event n-grams for each session. In some examples, the features are calculated based on the selected subset of n-grams. In various examples, the processor can separately calculate a numeric attribute for each type of the n-grams that indicates how common each type of n-gram is within the session. In some examples, the processor can separately calculate a numeric attribute for each type of the n-grams that indicates a duration of each type of n-gram within the session. In various examples, the processor can separately calculate a numeric attribute for each type of the n-grams that includes a statistical value for movement of a mouse within the events of the each type of n-gram.

At block 210, the processor trains a machine learning model based on the calculated features. For example, the processor can train the machine learning model using any suitable technique, such as any suitable supervised or unsupervised machine learning techniques.

At block 212, the processor outputs a trained machine learning model. For example, the trained machine learning model may be a machine learning classifier such as a naive Bayes, Random Forest, Gradient Boosting Trees, or a Neural Network. In some examples, the trained machine learning model may be a machine learning outlier detection model such as an isolation forest or one class state vector machine (SVM).

The process flow diagram of FIG. 2 is not intended to indicate that the operations of the method 200 are to be executed in any particular order, or that all of the operations of the method 200 are to be included in every case. For example, the block 206 may be excluded from method 200. Additionally, the method 200 can include any suitable number of additional operations.

Figure 3:
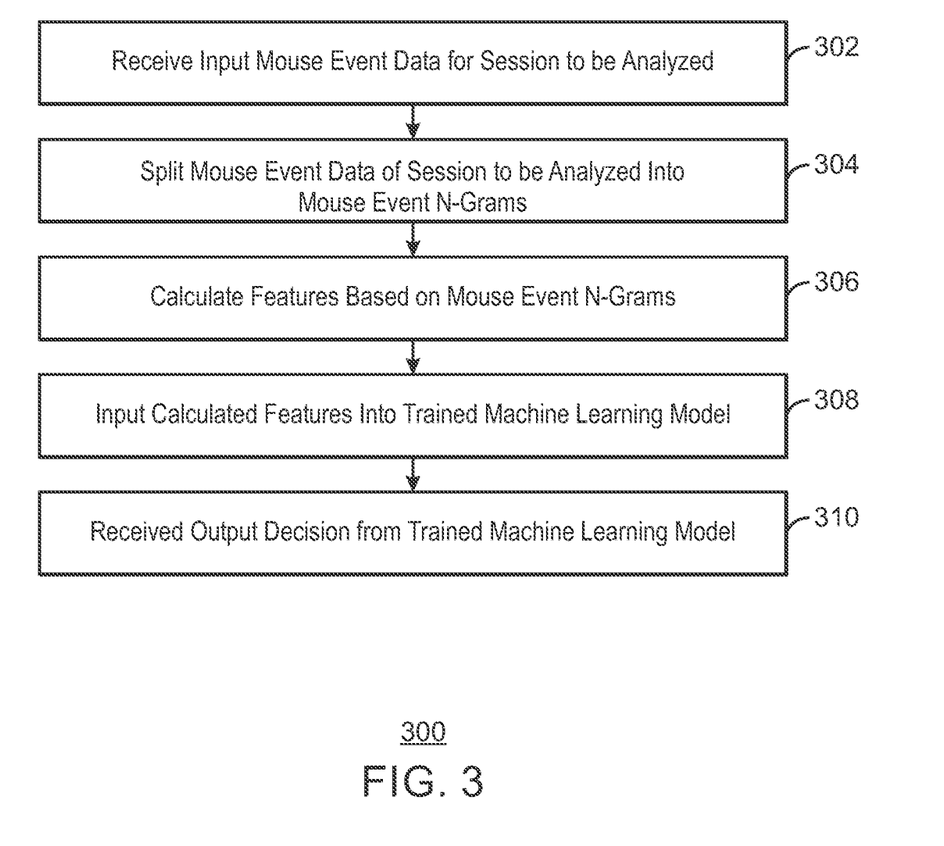
FIG. 3 is a block diagram of an example method that can detect malicious activity using a machine learning model using extracted features from n-grams of mouse event data.

FIG. 3 is a process flow diagram of an example method that can detect malicious activity using a machine learning model using extracted features from n-grams of mouse event data. The method 300 can be implemented with any suitable computing device, such as the computing device 400 of FIG. 4 and is described with reference to the system 100 of FIG. 1. For example, the methods described below can be implemented by the processor 402 of FIG. 4.

At block 302, a processor receives input mouse event data for a session to be analyzed. For example, the mouse event data may include mouse clicks, mouse movements, and scrolling events, and associated relative times, pages, and screen positions.

At block 304, the processor splits the mouse event data of the session to be analyzed into mouse event n-grams. For example, based on the value of n, the processor may generate groups of consecutive mouse events and corresponding data, such as relative times and associated pages and screen positions. In some examples, mouse event n-grams not selected during training may be discarded. In various examples, the mouse event n-grams may be aggregated by type. For example, the processor can group together all n-grams with the same events in the same order.

At block 306, the processor calculates features based on the mouse event n-grams for each session. For example, the features may be calculated for each type of n-gram.

At block 308, the processor inputs the calculated features into the trained machine learning model. For example, the trained machine learning model may be executed as a machine learning classifier can be a naive Bayes, Random Forest, Gradient Boosting Trees, Neural Network, or any other suitable machine learning classifier. In some examples, the trained machine learning model may be executed as machine learning outlier detection model such as an isolation forest, one class state vector machine (SVM), etc.

At block 310, the processor receives an output decision from the trained machine learning model. For example, decision can be a classification of the session. In some examples, the decision may output whether the session should be considered as an outlier. In various examples, the decision can be supported with a score that indicates the confidence of the model for the decision.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

In some scenarios, the techniques described herein may be implemented in a cloud computing environment. As discussed in more detail below in reference to at least FIGS. 4-7, a computing device configured to detect malicious activity using a machine learning model trained using extracted features from n-grams of mouse event data may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
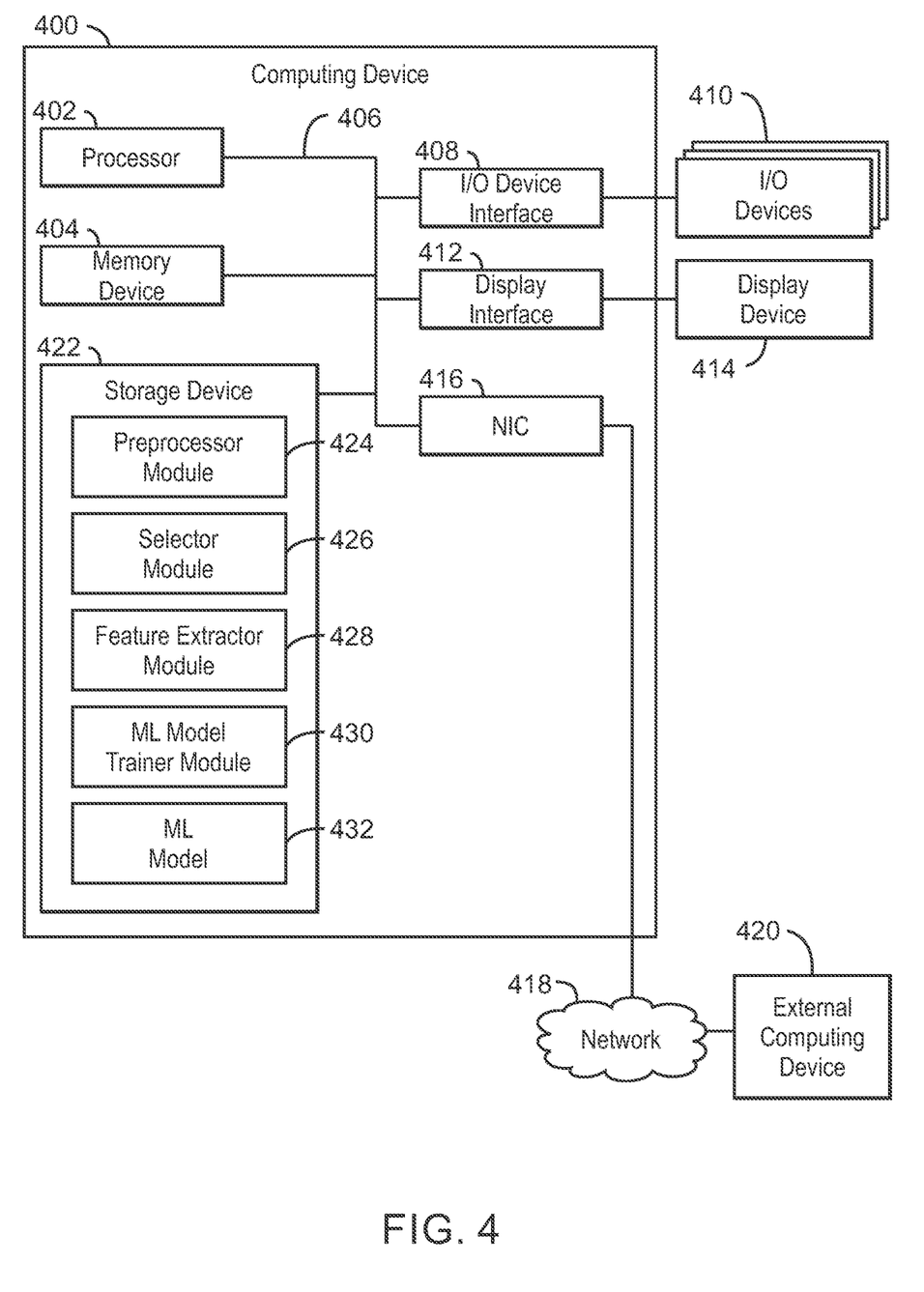
FIG. 4 is a block diagram of an example computing device that can detect malicious activity using a machine learning model trained on n-grams of mouse event data.

FIG. 4 is block diagram of an example computing device that can detect malicious activity using a machine learning model trained on n-grams of mouse event data. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a preprocessor module 424, a selector module 426, a feature extractor module 428, a machine learning trainer module 430, and a machine learning model 432. The preprocessor module 424 can receive mouse event data of a number of online sessions. For example, the mouse event data may be of a number of online sessions used for training or an online session to be analyzed. In various examples, the mouse event data may include a relative time, an event type, and a screen position, among other information. The preprocessor module 424 can split the mouse event data of each session into mouse event n-grams. For example, the mouse event n-grams each include a number of consecutive actions. The selector module 426 can selecting a subset of n-grams of the mouse event n-grams based on a heuristic. The feature extractor module 428 can extract features from the mouse event n-grams. In some examples, the extracted features may include timing features, ratio features, distance features, or any combination thereof. In various examples, the extracted features may include a type ratio, a mean time ratio, a median distance, a mean X-axis time, or any combination thereof. The machine learning trainer module 430 can train the machine learning model based on the calculated features. The machine learning model 432 can receive extracted features and output a decision. For example, the output decision may include a classification of the session.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). In some examples, the computing device 400 may not include the selector module 426. Furthermore, any of the functionalities of the preprocessor module 424, the selector module 426, the feature extractor module 428, the machine learning trainer module 430, and the machine learning model 432, may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the preprocessor module 424, the selector module 426, the feature extractor module 428, the machine learning trainer module 430, and the machine learning model 432 can be implemented with logic, wherein the logic, as referred to herein, can include any suitable hardware (e.g., a processor, among others), software (e.g., an application, among others), firmware, or any suitable combination of hardware, software, and firmware.

Figure 5:
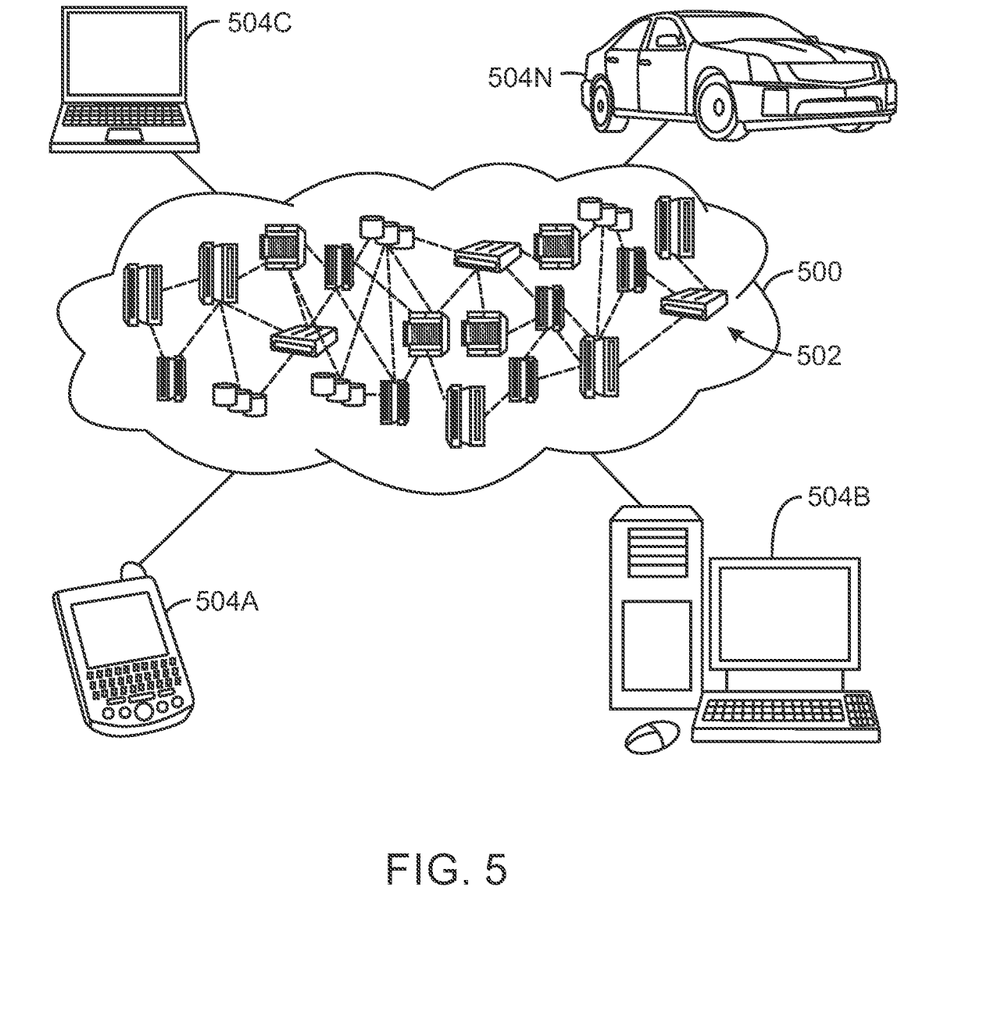
FIG. 5 is a diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
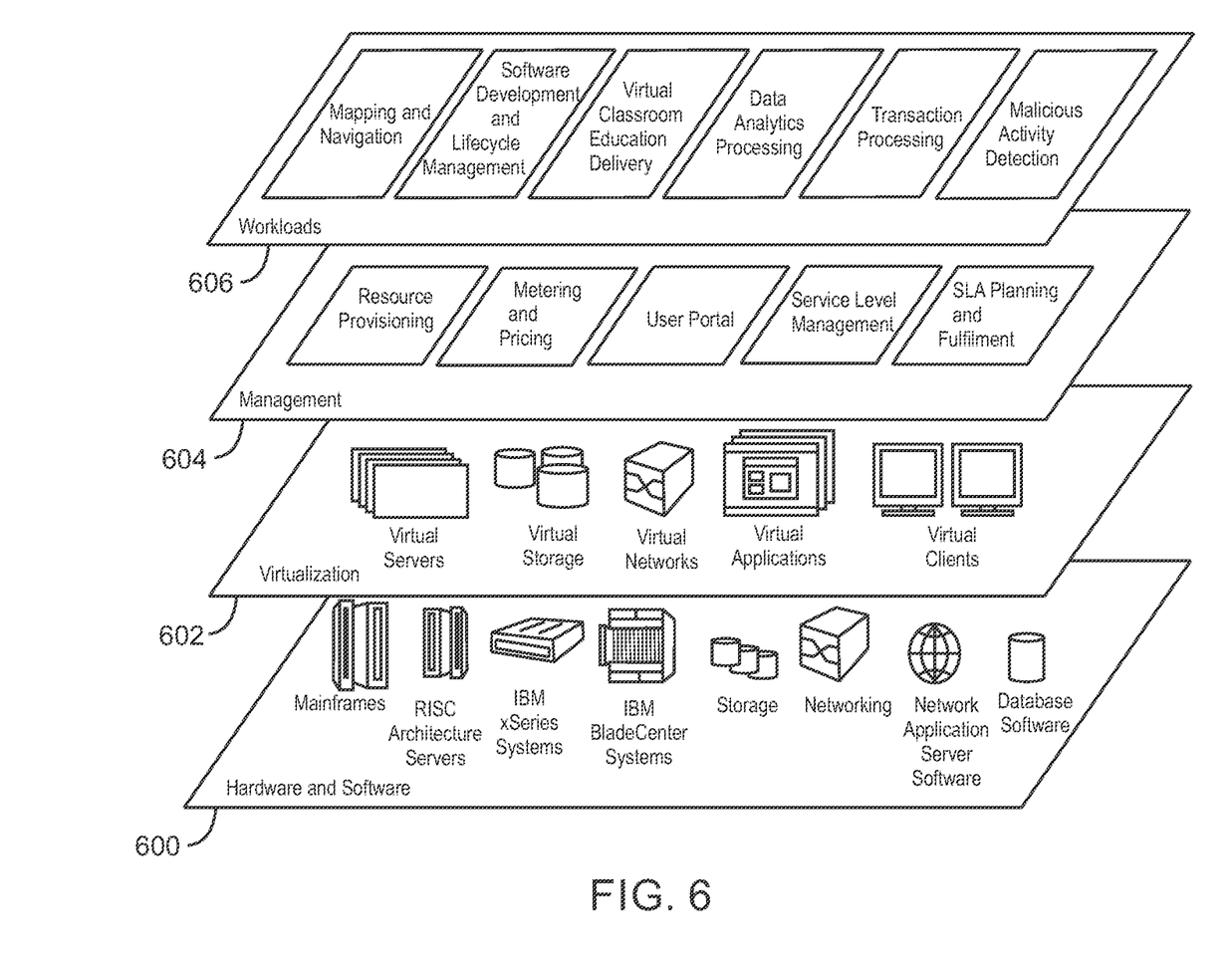
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and malicious activity detection.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
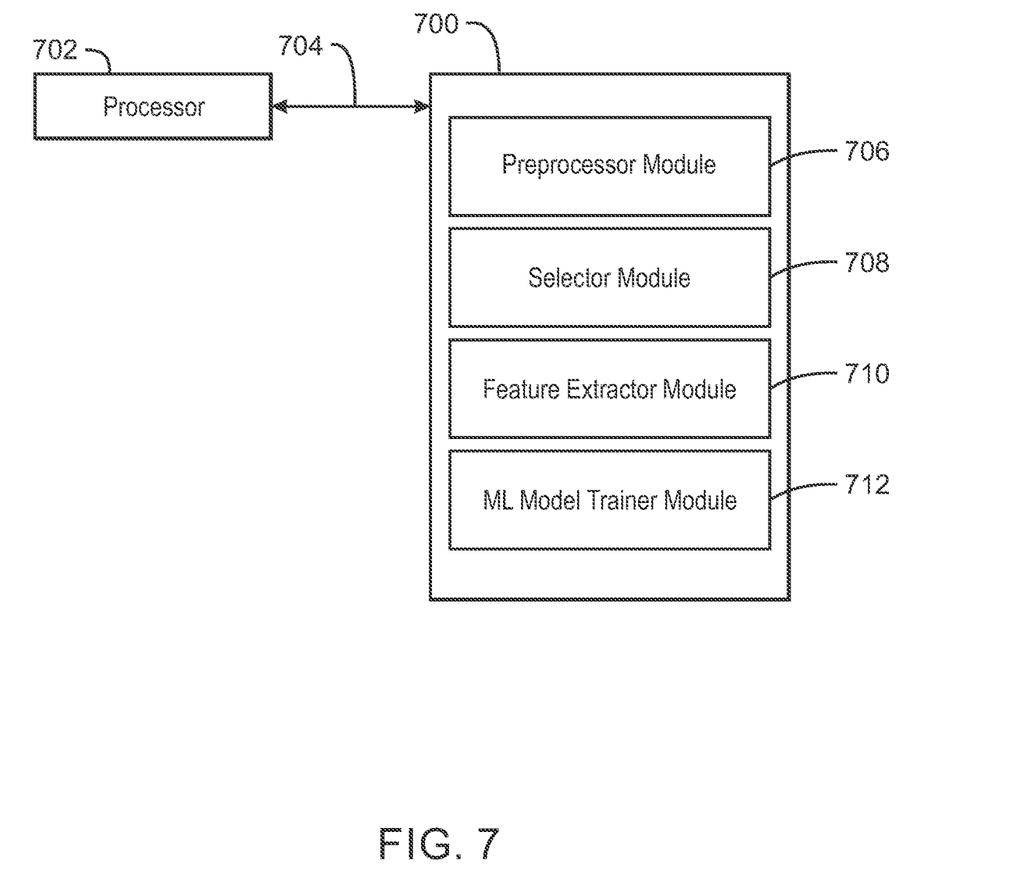
FIG. 7 is an example tangible, non-transitory computer-readable medium that can train a machine learning model to detect malicious activity using features extracted from n-grams of mouse event data.

Referring now to FIG. 7, a block diagram is depicted of an example tangible, non-transitory computer-readable medium 700 that can train a machine learning model to detect malicious activity using features extracted from n-grams of mouse event data. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the methods 200 and 300 of FIGS. 2 and 3.

The various software components discussed herein may be stored on the tangible, non-transitory, computer-readable medium 700, as indicated in FIG. 7. For example, a preprocessor module 706 includes code to receive mouse event data of a number of online sessions. The preprocessor module 706 also includes code to split the mouse event data for each of the number of online sessions into mouse event n-grams. A selector module 708 includes code to selecting a subset of n-grams of the mouse event n-grams based on a heuristic. For example, the selector module 708 can select a subset of n-grams of the mouse event n-grams based on a term-frequency-inverse document frequency (TF-IDF) heuristic that uses n-grams as terms and the sessions as a document. A feature extractor module 710 includes code to calculate features based on the mouse events n-grams for each session. For example, at training, the features may be calculated based on a selected subset of n-grams. The feature extractor module 710 also includes code to separately calculate a numeric attribute for each type of the n-grams that indicates how common each type of n-gram is within the session. The feature extractor module 710 also further includes code to separately calculate a numeric attribute for each type of the n-grams that indicates a duration of each type of n-gram within the session. The feature extractor module 710 further includes code to separately calculate a numeric attribute for each type of the n-grams that includes a statistical value for movement of a mouse within the events of the each type of n-gram. The machine learning (ML) model trainer module 712 includes code to train a machine learning model based on the extracted features. For example, the machine learning model may be a machine learning classifier can be a naive Bayes, Random Forest, Gradient Boosting Trees, Neural Network, or any other suitable machine learning classifier. In some examples, the trained machine learning model may be a machine learning outlier detection model such as an isolation forest, one class state vector machine (SVM), etc. In various examples, the trained machine learning model may be used to generate a decision based on an input set of extracted features of a session to be analyzed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application. In addition, in various examples, the tangible, non-transitory, computer-readable medium 700 may exclude any of the modules 706-712. For example, the tangible, non-transitory, computer-readable medium 700 may not include the selector module 708.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive mouse event data of a plurality of online sessions;
split the mouse event data of the plurality of online sessions into mouse event n-grams;
selecting a subset of n-grams of the mouse event n-grams based on a term-frequency-inverse document frequency (TF-IDF) heuristic that uses n-grams as terms and the sessions as a document;
calculate features based on the subset of n-grams; and
train a machine learning model based on the calculated features;
receive mouse event data of a session, wherein the mouse event data of the session includes consecutive mouse actions taken during the session, a first mouse action having at least an event type, a start time, a starting screen coordinate, an end time, and an ending screen coordinate;
split the mouse event data of the session into session mouse event n-grams, wherein a first mouse event n-gram aggregates at least the start time, the starting screen coordinate, the end time, and the ending screen coordinate of the first mouse action;
extract features from the session mouse event n-grams;
send the extracted features to the trained machine learning model; and
receive an output decision from the trained machine learning model indicating whether the session is malicious.

2. The system of claim 1, wherein the extracted features comprise a type ratio feature indicating a total number of session mouse event n-grams for a first event type divided by a total number of n-grams for the session.

3. The system of claim 1, wherein the extracted features comprise a mean time of session mouse event n-grams for a first event type.

4. A computer-implemented method, comprising:
receiving, via a processor, mouse event data of a plurality of online sessions, wherein the mouse event data of a first online session includes consecutive mouse actions taken, a first mouse action having at least an event type, a start time, a starting screen coordinate, an end time, and an ending screen coordinate;
splitting, via the processor, the mouse event data of the plurality of online sessions into mouse event n-grams, wherein a first mouse event n-gram aggregates at least the start time, the starting screen coordinate, the end time, and the ending screen coordinate of the first mouse action;
selecting a subset of n-grams of the mouse event n-grams based on a term-frequency-inverse document frequency (TF-IDF) heuristic that uses n-grams as terms and the sessions as a document;
calculating, via the processor, features based on the subset of n-grams;
training, via the processor, a machine learning model based on the calculated features;
receiving, via the processor, input mouse event data for a session to be analyzed;
splitting, via the processor, the mouse event data of the session to be analyzed into session mouse event n-grams;
calculating, via the processor, features based on the session mouse event n-grams;
inputting, via the processor, the calculated features into the trained machine learning model; and
receiving, via the processor, an output decision from the trained machine learning model indicating whether the session to be analyzed is malicious.

5. The computer-implemented method of claim 4, wherein calculating the features comprises separately calculating a numeric attribute for each type of the n-grams that indicates how common each type of n-gram is within the session.

6. The computer-implemented method of claim 5, wherein calculating the features comprises separately calculating a numeric attribute for each type of the n-grams that indicates a duration of each type of n-gram within the session.

7. The computer-implemented method of claim 5, wherein calculating the features comprises separately calculating a numeric attribute for each type of the n-grams that comprises a statistical value for movement of a mouse within the events of the each type of n-gram.

8. A computer program product for training machine learning models, the computer program product comprising a computer-readable storage medium having program code embodied therewith, wherein the computer readable storage medium is not a transitory signal per se, the program code executable by a processor to cause the processor to:
  receive mouse event data of a plurality of online sessions, wherein the mouse event data of a first online session includes consecutive mouse actions taken, a first mouse action having at least an event type, a start time, a starting screen coordinate, an end time, and an ending screen coordinate;
  split the mouse event data of the plurality of online sessions into mouse event n- grams, wherein a first mouse event n-gram aggregates at least the start time, the starting screen coordinate, the end time, and the ending screen coordinate of the first mouse action;
  select a subset of n-grams of the mouse event n-grams based on a term-frequency-inverse document frequency (TF-IDF) heuristic that uses n-grams as terms and the sessions as a document;
  calculate features based on the subset of n-grams;
  train a machine learning model based on the calculated features;
  receive, via the processor, input mouse event data for a session to be analyzed;
  split, via the processor, the mouse event data of the session to be analyzed into session mouse event n-grams;
  calculate, via the processor, features based on the session mouse event n-grams;
  input, via the processor, the calculated features into the trained machine learning model; and
  receive, via the processor, an output decision from the trained machine learning model indicating whether the session to be analyzed is malicious.

9. The computer program product of claim 8, further comprising program code executable by the processor to separately calculate a numeric attribute for each type of the n-grams that indicates how common each type of n-gram is within the session.

10. The computer program product of claim 8, further comprising program code executable by the processor to separately calculate a numeric attribute for each type of the n-grams that indicates a duration of each type of n-gram within the session.

11. The computer program product of claim 8, further comprising program code executable by the processor to separately calculate a numeric attribute for each type of the n-grams that comprises a statistical value for movement of a mouse within the events of the each type of n-gram.

12. The system of claim 1, wherein the machine learning model is a one class State Vector Machine (SVM).

13. The computer-implemented method of claim 4, wherein the machine learning model is a one class State Vector Machine (SVM).

14. The computer program product of claim 8, wherein the machine learning model is a one class State Vector Machine (SVM).

* * * * *